United States Patent
Kloster

[11] Patent Number: 5,116,280
[45] Date of Patent: May 26, 1992

[54] CONDITIONED AIR DISTRIBUTION SYSTEM FOR A CONVERSION VAN

[75] Inventor: John M. Kloster, Caledonia, Ill.

[73] Assignee: Atwood Industries, Inc., Rockford, Ill.

[21] Appl. No.: 650,086

[22] Filed: Feb. 4, 1991

[51] Int. Cl.$^5$ ............................... B60H 1/26
[52] U.S. Cl. ........................... 454/137; 62/244; 454/156
[58] Field of Search ............ 98/2.15, 2.14, 2.11, 98/2.05, 14, 10, 4; 62/244

[56] References Cited

U.S. PATENT DOCUMENTS

| | | | |
|---|---|---|---|
| 1,982,125 | 11/1934 | Stacey, Jr. et al. | 98/4 |
| 2,143,827 | 1/1939 | Demarest | 98/10 |
| 2,553,881 | 5/1951 | Suttles | 98/2.15 |
| 4,763,564 | 8/1988 | Czarnecki et al. | 98/2.14 |

FOREIGN PATENT DOCUMENTS 0144118  1/1982  Japan ................... 98/2.15
0004617  1/1983  Japan ................... 98/2.15

Primary Examiner—Albert J. Makay
Assistant Examiner—John Sollecito
Attorney, Agent, or Firm—Leydig, Voit & Mayer, Ltd.

[57] ABSTRACT

Runners extend along the junctions of the interior side panels and the headliner of the van and define plenums for conditioned air supplied by the auxiliary heat exchanger of a climate control system, the heat exchanger being mounted beneath the floor of the van. Air distribution outlets are mounted in the runners and discharge conditioned air downwardly into the interior of the van. Conditioned air is supplied to one of the plenums by a first hose extending upwardly from the heat exhanger, along the outboard side of one of the interior side panels and into one of the runners. A second hose extends upwardly generally alongside the first hose but crosses over the van between the roof and the headliner and leads into the other runner to supply conditioned air to the other plenum.

11 Claims, 3 Drawing Sheets

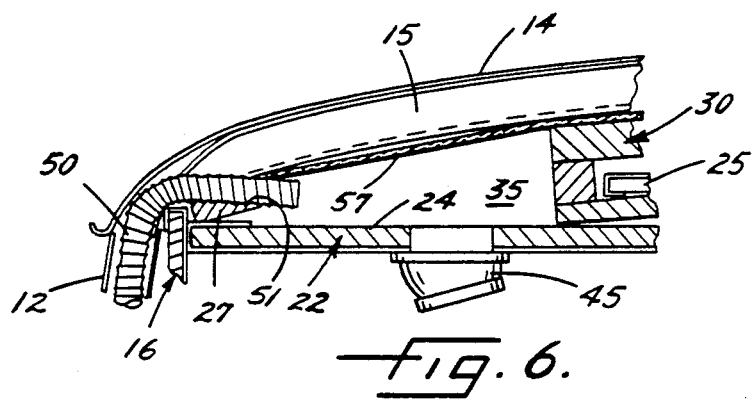
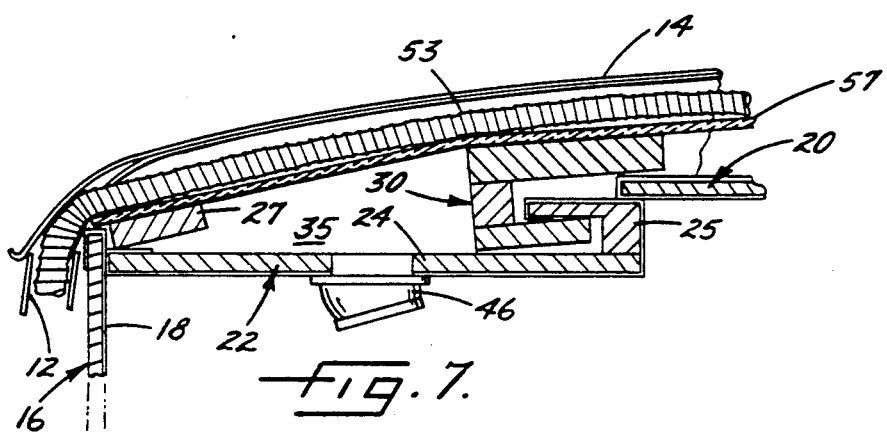
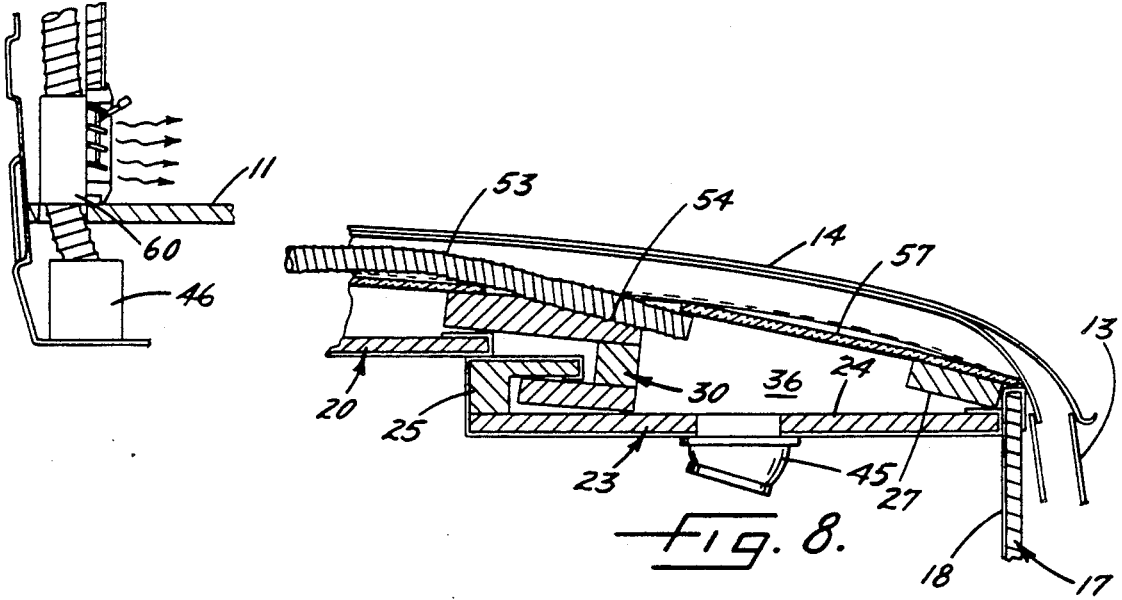

CONDITIONED AIR DISTRIBUTION SYSTEM FOR A CONVERSION VAN

BACKGROUND OF THE INVENTION

This invention relates to an air distribution system for a motorized conversion van and, more particularly, to a system for distributing conditioned air from an auxiliary heat exchanger into the interior of the van.

As is well known, a conversion van is created by adding various appointments such as windows, seats, interior paneling and other conveniences to a basic van body. As part of the conversion, the side walls of the body are lined with attractive interior side panels while the roof of the van is concealed by a headliner. It is necessary to trim the junctions between the headliner and the upper ends of the interior side panels and, in many cases, this is achieved through the use of longitudinally extending runners having trim panels spaced downwardly from the roof and spanning the lateral spaces between the headliner and the side panels. Frequently, the spaces along the sides of the van between the roof and the trim panels are used to string electrical wires which extend to accessories such as lights, electrical jacks, switches and the like mounted in the trim panels.

In a typical conversion van, an auxiliary heat exchanger is located in the rear end of the van adjacent the floor thereof and directs conditioned (i.e., either heated or cooled) air into the interior of the van. The conditioned air usually is distributed into the van through diffusers located across the top rear of the van near the headliner. With systems of this type, the auxiliary heat exchanger takes up significant space in the rear of the van. Distribution of the air through rear diffusers creates uncomfortable drafts and does not offer passengers individual control over the volume and direction of the airflow.

SUMMARY OF THE INVENTION

The general aim of the present invention is to provide, in a conversion van, an air distribution system which removes the auxiliary heat exchanger from the interior of the van and which takes advantage of the overhead runners and trim panels to enable air to be distributed more uniformly into the van and with greater ability to control the volume and direction of the airflow.

A more detailed object of the invention is to achieve the foregoing by providing an air distribution system in which the auxiliary heat exchanger is located below the floor van and directs conditioned air into the overhead runners for discharge into the van by way of air distribution outlets located in the trim panels. The distribution outlets preferably are spaced along the trim panels and are of the type which may be individually adjusted to change the direction and volume of air flow.

The invention also resides in the unique manner of supplying conditioned air from the below-the-floor heat exchanger to the two overhead and laterally spaced runners.

BRIEF DESCRIPTION OF THE DRAWINGS

FIGS. 5, 6, 7 and 8 are enlarged fragmentary cross-sections taken substantially along the lines 5—5, 6—6, 7—7 and 8—8, respectively, of FIG. 2.

DETAILED DESCRIPTION OF THE PREFERRED EMBODIMENT

Figure 2:
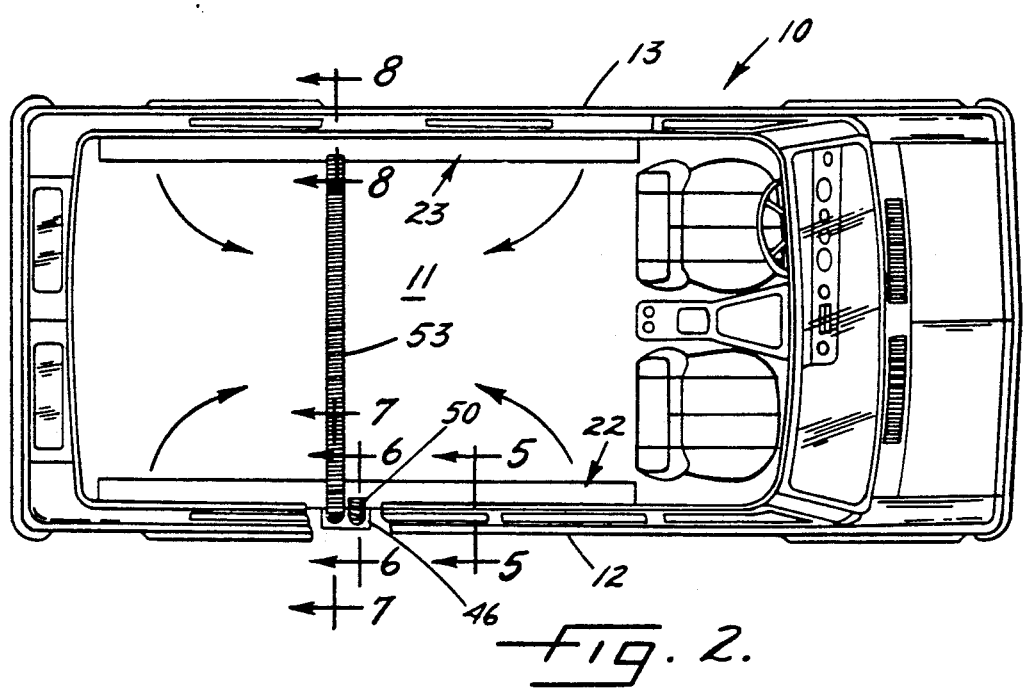
FIG. 2 is a top plan view of the van with the roof broken away in order to diagrammatically illustrate portions of the air distribution system.
Figure 4:
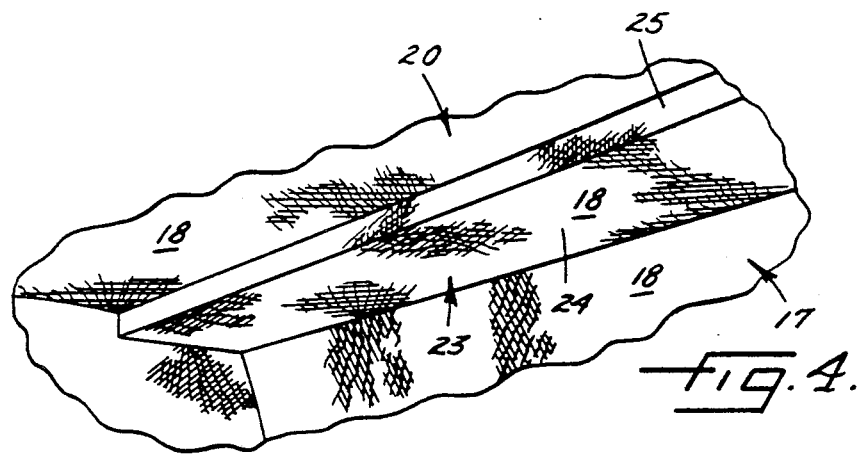
FIG. 4 is a perspective view showing a portion of one of the runners of the van.

For purposes of illustration, the invention has been shown in the drawings in conjunction with a motorized vehicle and, more particularly, a conversion van 10. The van includes a body having a floor 11 (FIGS. 2 and 7) laterally spaced and longitudinally extending upright side walls 12 and 13 extending upwardly from the floor, and a roof 14 at the upper ends of the side walls. The roof is supported by several bowed ribs 15 (FIGS. 4 and 5) spaced longitudinally from one another and extending laterally of the van.

The interior of the van 10 is trimmed for purposes of appearance and comfort. To this end, the side walls 12 and 13 are lined with upright interior side panels 16 and 17, respectively, (FIGS. 5 to 8). Each panel is covered on its inboard side by a layer 18 of fabric, vinyl or other suitable decorative material. The underside of the roof 14 and the roof ribs 15 are concealed by a headliner 20 whose lower side is also covered with a layer 18 of decorative material. The headliner extends from front to rear along the interior of the van but its longitudinally extending edges are spaced laterally a substantial distance from the interior side panels 16 and 17.

So-called runners 22 and 23 are located adjacent the side panels 16 and 17, respectively, and extend laterally from the side panels to the headliner 20 in order to trim the junctions between the headliner and the side panels. Herein, each runner includes a generally horizontal trim panel 24 (FIG. 5) spaced below the headliner 20 and having an outboard edge which abuts the respective side panel 16, 17. Supported on the upper side of the inboard portion of each trim panel 24 and defining an extension of the panel is a generally L-shaped member 25 whose upper edge portion abuts the lower edge portion of the headliner and supports the headliner. Each trim panel 24 and its L-shaped extension 25 are also covered with decorative material 18. Thus, the runners 22, 23 form attractive transitions between the headliner 20 and the side panels 16, 17.

Figure 4A:
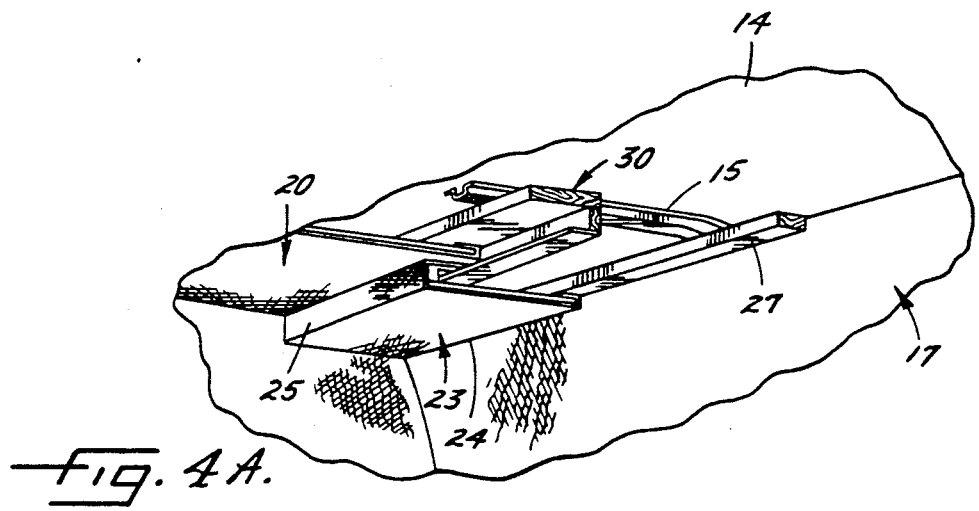
FIG. 4A is a perspective view generally similar to FIG. 4 but with certain parts broken away so as to illustrate the interior construction of the runner.
Figure 5:
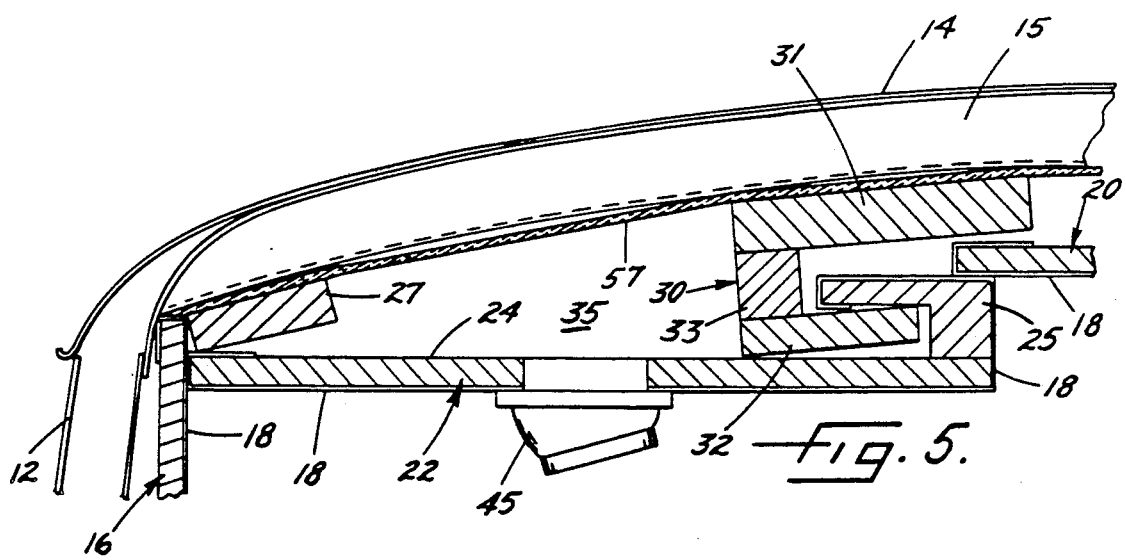

As shown most clearly in FIGS. 4A and 5, the outboard edge portion of the trim panel 24 of each runner 22, 23 engages and is secured to a so-called runner cleat 27. Each cleat extends along the length of the van, is located near the upper end of the adjacent side panel 16, 17 and is secured to the roof ribs 15.

Supporting the inboard edge portion of each runner 22, 23 is a so-called J-rail 30 (FIGS. 5 to 8). Each J-rail extends along the length of the van 10 and includes an upper generally horizontal member 31 which is secured to the roof ribs 15. A generally parallel lower member 32 is secured to the upper member by an intermediate member 33 and defines a shelf which supports the L-shaped extension 25 of the runner. Thus each runner 22, 23 is supported by the cleat 27 and the J-rail 30 and, in turn, supports the headliner 20.

As shown most clearly in FIGS. 5 and 8, spaces or chambers 35 and 36 are defined above the trim panels 24 of the runners 22 and 23, respectively. The bottom of each chamber is defined at least in part by the trim panel 24, the inboard side of the chamber is defined at least in part by the J-rail 30 and the outboard side of the chamber is defined at least in part by the cleat 27. Electrical wires 38 (FIG. 3) extend through each chamber and lead to overhead accessory items such as a reading lamp 39, an electrical jack 40, and a switch 41 (FIG. 3), such items being mounted in the trim panels 24.

In accordance with the present invention, advantage is taken of the chambers 35 and 36 in the runners 22 and 23 to effect the distribution of conditioned air into the interior of the van 10. By using the chambers as air distribution plenums, noise levels and drafts are reduced and individual air regulation and direction is made more convenient.

Figure 3:
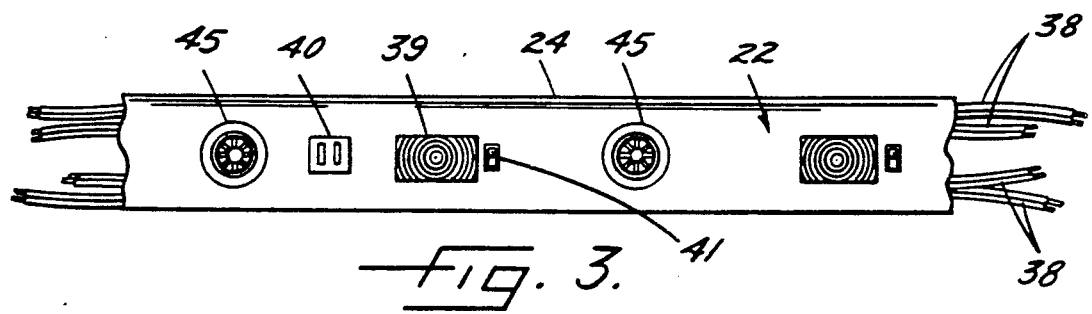
FIG. 3 is a fragmentary bottom plan view of one of the runners equipped with the air distribution outlets of the system of the invention.

More specifically, the trim panel 24 of each runner 22, 23 is equipped with a plurality of longitudinally spaced air distribution outlets 45 (FIGS. 3 and 5). Each outlet is fitted into the trim panel and preferably is of the type which may be swiveled to control the direction of airflow and rotated to increase or decrease the volume of flow. Each outlet communicates with the overlying chamber or plenum 35, 36 and is effective to distribute conditioned air downwardly into the interior of the van 10.

Figure 1:
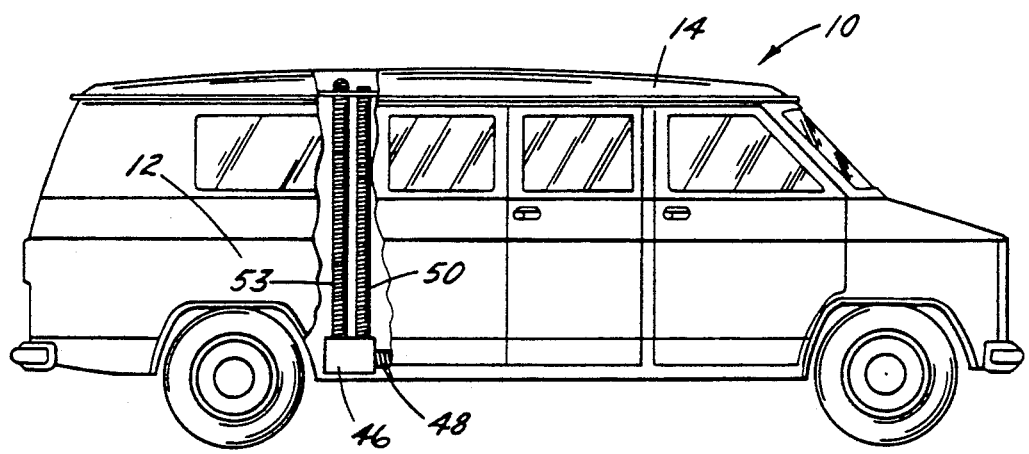
FIG. 1 is a side elevational view of a typical conversion van and is partially broken away so as to diagrammatically show part of the new and improved air distribution system incorporating the unique features of the present invention.

Conditioned air for supply to the plenums 35 and 36 is created by an auxiliary heat exchanger 46 (FIG. 1) associated with the van 10. The heat exchanger is of conventional construction and, in carrying out the invention, is located below the floor 11 of the van in order to conserve space inside of the van. Herein, the heat exchanger has been shown as being located adjacent the side wall 12 of the van and between the front and rear wheels thereof. The heat exchanger could, however, be located beneath the floor 11 near the other side wall 13 or could be located at the rear of the van. The heat exchanger includes an evaporator which receives condensed refrigerant under low pressure from the main climate control system of the van through a line 48 and effects evaporation of the refrigerant in order to cool air circulated past the evaporator by a blower which forms part of the auxiliary heat exchanger. In addition, the heat exchanger may include a coil for receiving hot coolant and for heating the air circulated by the blower.

Air conditioned by the heat exchanger 46 is supplied to the plenums 35 and 36 via air supply conduit means. Herein, such means comprise a first flexible hose 50 (FIGS. 1 and 6) communicating with the heat exchanger add leading upwardly from the heat exchanger between the side wall 12 and the side panel 16. The hose passes over the upper edge of the side panel 16, passes through an access opening 51 (FIG. 6) formed in the adjacent cleat 27, and leads into the plenum 35. Thus, conditioned air is delivered into the plenum 35 via the hose 50 and is distributed into the van 10 by way of the outlets 45 that communicate with the plenum 35.

The air supply conduit means further include a second flexible hose 53 (FIGS. 1, 7 and 8) which communicates with the heat exchanger 46 and which extends upwardly from the heat exchanger and alongside the hose 50 between the side wall 12 and the side panel 16. The hose 53 passes over the upper edge of the side panel 16, extends transversely across the van 10 beneath the roof 14 and between a pair of the roof ribs 15, extends through an access opening 54 (FIG. 8) in the J-rail 30 of the runner 23, and then extends into the plenum 36. As a result, conditioned air is delivered into the plenum 36 through the crossover hose 53 for discharge through the outlets 45 associated with the runner 23.

In order to confine the air in the plenums 35 and 36 and to insulate the plenums, a sheet 57 (FIGS. 5 to 8) of insulation extends beneath the roof 14 and closes off the tops of the plenums. As shown in FIGS. 5 and 8, the insulation 57 is located beneath the roof ribs 15 and lies on top of the cleats 27 and the J-rails 30. The insulation may be of the type sold under the trade designator Astrofoil, such insulation comprising an inner core of bubble pack material sandwiched between two layers of aluminum foil.

If the heat exchanger 46 is used for heating as well as cooling, selectively operable diverter valves 60 (FIG. 7) may be located in the hoses 50, 53 to block heated air from flowing upwardly into the plenums 35, 36 and to cause the heated air to be discharged through lower distribution vents located just above the floor 11. When the system is in the cooling mode, the diverter valves are switched to close off the floor vents and to cause cooled air to be directed upwardly to the plenums.

From the foregoing, it will be apparent that the present invention brings to the art a new and improved conditioned air distribution system in which location of the heat exchanger 46 beneath the floor 11 of the van 10 removes the heat exchanger from the interior of the van so as to free up space in the van for other purposes. By converting the existing runners 22 and 23 into air plenums 35 and 36, advantage is taken of the runners to enable distribution of the conditioned air through overhead outlets 45 which may be individually controlled to regulate the volume and direction of the airflow and to provide greater passenger comfort.

While the invention has been disclosed specifically in connection with the use of runners 22 and 23 having trim panels 24 between separately formed side panels 16 and 17 and a separately formed headliner 20, it is contemplated that the air distribution system may be used with thermoformed side panels and a thermoformed headliner wherein upwardly opening air plenums are molded in the outboard side portions of the headliner and air supply conduit means or ducts are molded in the outboard sides of the side panels.

I claim:

1. The combination of, a motorized conversion van, and a system for supplying conditioned air to the interior of said van, said van having a floor, having a pair of laterally spaced and longitudinally extending interior side panels extending upwardly from said floor and having a roof adjacent the upper ends of said side panels, a headliner spaced below and substantially concealing said roof, said headliner having outboard margins near said side panels, a longitudinally extending plenum located inboard of each side panel below said roof and between the side panel and the adjacent outboard margin of said headliner the outer margins of said plenum being defined in part by said side panel and said roof, a plurality of individually controllable air distribution outlets spaced along, communicating with and extending downwardly from each plenum in order to direct conditioned air downwardly into said van at a plurality of locations beneath each plenum, a heat exchanger located beneath said floor, and air supply conduit means communicating with said heat exchanger and extending upwardly therefrom along the outboard side of one of said side panels, said conduit means communicating with the plenum adjacent said one side panel and extending laterally across said van between said headliner and said roof into communication with the plenum adjacent the other side panel.

2. The combination defined in claim 1 in which said heat exchanger is located adjacent said one side panel about midway along the length of said van.

3. The combination defined in claim 1 in which each plenum is defined in part by a generally horizontal and longitudinally extending trim panel laterally spanning the space between the adjacent side panel and the adjacent outboard margin of said headliner, said air distribution outlets extending downwardly from said trim panels.

4. The combination defined in claim 1 further including means between said heat exchanger and said plenums and selectively operable to divert air away from said plenums and into the interior of said van adjacent the floor thereof.

5. The combination of, a motorized conversion van, and a system for supplying conditioned air to the interior of said van, said van having a floor, having a pair of laterally spaced and longitudinally extending upright interior side panels extending upwardly from said floor and having a roof adjacent the upper ends of said side panels, a headliner spaced below and substantially concealing the underside of said roof, said headliner having longitudinally extending edges spaced laterally inwardly from said side panels, a longitudinally Extending trim panel spanning the lateral space between each side panel and the adjacent edge of the headliner, a longitudinally extending plenum defined above each trim panel between the adjacent side panel and the adjacent edge of the headliner, each plenum including a bottom defined at least in part by said trim panel, a top defined at least in part by a layer of insulation, an outboard side defined at least in part by a cleat, and an inboard side defined at least in part by a J-rail, at least one air distribution outlet mounted in each trim panel and communicating with the overlying plenum in order to direct conditioned air downwardly into said van, a heat exchanger located beneath said floor, and air supply conduit means communicating with said heat exchanger and extending upwardly from said heat exchanger adjacent one of said side panels, said conduit means communicating with the plenum adjacent said one side panel and extending laterally across said van between said headliner and said roof and communicating with the plenum adjacent the other of said side panels.

6. The combination defined in claim 5, in which a plurality of individually controllable air distribution outlets is spaced along and extends downwardly from each trim panel.

7. The combination defined in claim, 5 in which said air supply conduit means include a hose extending upwardly from said heat exchanger, through the cleat associated with the plenum adjacent said one side panel, and into such plenum.

8. The combination defined in claim 5 in which said air supply conduit means include a hose extending upwardly from said heat exchanger, across said van between said headliner and said roof, through the J-rail of the plenum adjacent the other of said side panels and into the latter plenum.

9. The combination defined in claim 7 in which said air supply conduit means include a second hose extending upwardly from said heat exchanger, across said van between said headliner and said roof, through the J-rail of the plenum adjacent the other of said side panels, and into the latter plenum.

10. The combination defined in claim 5 in which said heat exchanger is located adjacent said one side panel about midway along the length of said van.

11. The combination defined in claim 5 further including means between said heat exchanger and said plenums and selectively operable to divert air away from said plenums and into the interior of said van adjacent the floor thereof.

* * * * *